(12) United States Patent
Billecke et al.

(10) Patent No.: US 7,169,840 B2
(45) Date of Patent: Jan. 30, 2007

(54) FLOOR COVERING ADHESIVE

(75) Inventors: Jochem Billecke, Bochem (DE); Rudiger Oberste-Padtberg, Wuppertal (DE); Thomas Wanke, Dortmund (DE); Kenneth A. Tarczewski, Dallas, GA (US); David Allen Smith, York, PA (US)

(73) Assignee: Ardex GmbH (DE)

( * ) Notice: Subject to any disclaimer, the term of this patent is extended or adjusted under 35 U.S.C. 154(b) by 52 days.

(21) Appl. No.: 10/267,001

(22) Filed: Oct. 8, 2002

(65) Prior Publication Data

US 2003/0134909 A1    Jul. 17, 2003

(30) Foreign Application Priority Data

Dec. 22, 2001   (DE) ................................ 101 63 897
Mar. 7, 2002    (DE) ................................ 102 10 143

(51) Int. Cl.
*C09J 107/02*    (2006.01)

(52) U.S. Cl. ...................... 524/271; 524/272; 524/522; 428/349; 428/355

(58) Field of Classification Search ................ 524/271, 524/272, 522; 428/349, 355
See application file for complete search history.

(56) References Cited

U.S. PATENT DOCUMENTS 4,709,084 A * 11/1987 Pavlin et al. ................ 560/118
5,935,312 A    8/1999 Krieger

FOREIGN PATENT DOCUMENTS

| WO | WO 97/40113 | * | 10/1997 |
| WO | WO 97/40113 A1 | | 10/1997 |

* cited by examiner

*Primary Examiner*—Robert D. Harlan
(74) *Attorney, Agent, or Firm*—Arnold B. Silverman; Daniel P. Cillo; Eckert Seamans Cherin & Mellott, LLC

(57) ABSTRACT

In a process for the manufacture of aqueous floor covering adhesives without the addition of solvents, high-boiling solvents, or plasticizers and with the use of a non-carboxylated styrene/butadiene (SBR) dispersion and of an agent providing initial adhesion, a melt of the agent providing initial adhesion, for example a resin with a melting point of 45 to 98° C., is added to the SBR dispersion under high shear forces for the purpose of obtaining a durably stable emulsion which provides not only high initial adhesion, but also high final strength.

12 Claims, No Drawings

FLOOR COVERING ADHESIVE

BACKGROUND OF THE INVENTION

The invention relates to a method for the manufacture of floor covering adhesives, in particular, of low-emission floor covering adhesives, on the basis of a polymer dispersion, and to a durably stable emulsion useable in floor covering adhesives.

Floor covering adhesives are understood as products suitable for bonding floor coverings such as linoleum, carpeting, PVC, and similar. Originally, these products were manufactured by dissolving rosins in organic solvents (benzene, toluene, or methanol) and adding synthetic resins, such as polyvinyl ether. In order to reduce the solvent emission during and after laying floor coverings, aqueous polymer dispersions based on PVAc, PAcr, EVA were used later with the addition of rosins, tall oil rosins, or hydrocarbon resins, dissolved in aromatic solvents such as toluene or xylene, to the aqueous dispersions. Moreover, for the purpose of further reducing the emissions (worker protection), the aforementioned resins were dissolved in plasticizers, such as phthalates, in high-boiling solvents, such as glycols, glycol acetates or phenoxy ethanol, and added to the polymer dispersions. For further reducing the emissions of organic components from floor covering adhesives, rosins or tall oil rosins were emulsified into the aforementioned polymer dispersions, though lately, polymer dispersions with the least possible residual monomer (worker and consumer protection) have been used. After the conversion from adhesives dissolved in solvents to aqueous adhesives, the polyacrylates have prevailed as binder basis in many Western European countries. After curing, these aqueous polymers offer very good adhesion properties, in particular, for polyvinyl chloride (PVC) and other elastic coverings.

By skillfully formulating and blending different types of resins, it is also possible to obtain good carpeting adhesives with high and early initial adhesion. In order to provide this type of floor covering adhesives with better initial adhesion, which in solvent-based adhesives was originally caused by the components dissolved in the solvents as well as by the solvents themselves, soft liquid resins are used which are emulsified into the polyacrylate dispersions. The application of resins of this type does permit the development of good initial adhesion (tack), but it reduces the final strength of the adhesive based on the said formulation.

In countries where floor covering adhesives are not applied to substrates insulated against moisture, i.e. for example, on building parts touching soil, thus on substrates which are long-term or periodically exposed to humidity, acrylic adhesives can be used only conditionally due to their lack of saponification resistance and water resistance. In areas of this type, emulsified adhesives based on so-called "high-solid" stryrene butadiene latices (SBR dispersions) have prevailed.

With the current state of the art, the instability of the above mentioned SBR latices makes it impossible to directly emulsify soft and hard resins into these SBR latices as can be done with polyacrylate dispersions, but rather, they have to be formulated with rosins and hydrocarbon resins dissolved in high-boiling solvents, in order to formulate adhesives with high initial adhesion. The concentration of the said solvents, high-boiling solvents, or plasticizers in commercially available floor covering adhesives amounts to up to 20% and is the source for VOCs with strong odor.

This is the reason why this type of product was not successful in several areas of Europe. The large volume of the aforementioned products added in the said manner leads to a stabilization of the SBR latex.

SUMMARY OF THE INVENTION

The invention has the object of providing a floor covering adhesive based on an aqueous styrene/butadiene dispersion which on the one hand, is largely odor-neutral and low in emissions (GEV criteria), and on the other hand, has high initial adhesion and high film strength after curing.

This object is achieved by a method for the manufacture of aqueous floor covering adhesives (emulsions) using a styrene/butadiene (SBR) dispersion, and optionally, blended with additional polymers and an agent providing initial adhesion, wherein a melt of the agent providing initial adhesion is added to the SBR dispersion under high shear forces for the purpose of obtaining a durably stable emulsion.

Furthermore, the object of the invention is the emulsion obtained in the above described manner, which emulsion has already been functioning as floor covering adhesive, as well as the application thereof for the manufacture of adhesives to be used in areas other than for bonding floor covering materials.

When the method is executed according to the invention, the coagulation of the styrene/butadiene copolymers with the substance providing adhesion during the emulsification is prevented. The adhesive or floor covering adhesive obtained by the procedure according to the invention meets the requirements of the GEV criteria (Emicode EC 1, very low in emissions).

DETAILED DESCRIPTION OF THE PREFERRED EMBODIMENTS

The styrene/butadiene dispersions may have a polymer solids content of 30 to 85%, preferably of 65 to 73%. These form films of high mechanical strength, they have high breaking strength and high elongation at break. styrene/butadiene dispersions are known to the expert and available on the market.

Adhesive substances suitable according to the invention or agents providing initial adhesion suitable according to the invention may be resins with melting points of 1 to 130° C. or mixtures thereof. Suitable resins are, for example, hydrocarbon resins, rosins, tall oil resins, esters of the said resins, as for example, glycerol ester and trialkylene glycol ester with 1, 2, 3, or 4 carbon atoms in the alkylene residue, as well as mixtures thereof. Particularly suitable are partially hydrated glycerol esters of balsam sorin and sorin triethylene glycol esters. The resins can be natural resins; they can be largely esterified. The adhesive substances suitable according to the invention preferably have an acid value of less than 40. According to the invention, soft resins and hard resins as well as mixtures thereof in all ratios can be used. Soft resins are resins with a melting point of up to approximately 40° C. Hard resins have a melting point of more than approximately 40° C. The agent providing initial adhesion which is used in the procedure according to the invention can have a melting point of 45 to 95° C., preferably of 60 to 85° C.

In a first step of the procedure, the agent providing adhesion can be melted and homogenized at a temperature of approximately 10 to 25° C. above the melting temperature of the resin component of the agent providing adhesion with the highest melting point. The resin melt obtained in this way serves as component for the further formulation of the emulsion which can be used as floor covering adhesive (adhesive).

In a second step of the procedure, the styrene/butadiene dispersion, unless it has already been adjusted to be alkaline, can be made alkaline, for example, by mixing it with an aqueous alkali or alkaline earth solution, and can be heated to 40 to 80° C. The addition of the alkali solution serves the saponification of part of the resin added subsequently, while the rosin soap developed in situ acts as emulsifier and contributes to the stabilization of the emulsion.

Subsequently, the resin melt is worked into the styrene/butadiene dispersion under high shear forces. It is important to prepare the dispersion and work the resin melt into the dispersion.

The resulting intermediate product, an emulsion, is cooled and can be stored for a period of time. A typical composition preferably has a solids content of 65 to 75 weight %; particularly preferable is a content of 67 to 73 weight %, for example, approximately of 70 weight %; the polymer/resin ratio is 100/1 to 100/400. In the event that a non-carboxylated styrene/butadiene copolymer is used, the dispersion will preferably have a pH value of at least about 8, preferably of 8.5 to 10.

In a further step of the procedure, an aqueous alkali mixture of a resin such as triethylene glycol ester (TEG) can be produced to which additional additives, such as a defoaming agent and an emulsifier, may be added. Preferably, this mixture has the form of an emulsion, because this makes it easier to work the mixture into the emulsion obtained originally from the resin melt and the styrene/butadiene copolymer.

In a further step of the procedure, the two pre-manufactured emulsions then can be mixed with additional polymer dispersions in different ratios, depending on the intended application. In this step of the procedure, conventional components of floor covering adhesives, such as water-retentive additives, fillers, thickeners, and preservatives, may be added. The resulting adhesives are shear-resistant and can be manufactured with conventional dissolvers or with other large stirring devices.

Additional polymers which may be added to the emulsion of resin melt and styrene/butadiene dispersion obtained according to the invention are polymers based on styrene/butadiene polymers, polyacrylates, polyacrylic acid esters, ethylene vinyl acetate, vinyl acetate/versatate polymers and mixtures thereof. These may be added in the form of a dispersion.

The floor covering adhesives obtained according to the invention can have a polymer/resin ratio of 100/1 to 100/400 and a solids content of up to approximately 85%.

The following examples serve to further explain the invention.

EXAMPLE 1

A melt with a temperature of 120° C. consisting of 75 weight % of glycerol ester with a melting point of approximately 85° C. and 25 weight % of triethylene glycol ester with a melting point of approximately 1° C. is produced and homogenized (step 1).

In step 2, a styrene butadiene latex is formulated with the following formula:

| | |
|---|---|
| Styrene butadiene latex | 32.6 weight % |
| Defoaming agent | 0.2 weight % |
| Water | 20.3 weight % |
| KOH solution (45%) | 0.5 weight % |
| Resin melt from step 1 | 46.5 weight % |

The resin melt from step 1 is emulsified into the aqueous styrene/butadiene dispersion under high shear forces.

In step 3, a floor covering adhesive is manufactured by homogenizing the following components:

| | |
|---|---|
| Latex/resin mixture from step 2 | 40.1 weight % |
| Triethylene glycol ester | 12.0 weight % |
| SBR latex | 2.7 weight % |
| Calcium carbonate filler | 33.4 weight % |
| KOH solution (45%) | 0.4 weight % |
| Thickening agent | 0.9 weight % |
| Water | 10.4 weight % |
| Preservative | 0.1 weight % |

The resulting floor covering adhesive is suitable for bonding PVC floor coverings. It is stable in a temperature range of 5 to 600 C over a period of more than 12 months and has the following technical data:
Viscosity: approximately 70,000 mPa°s
Specific weight: 1.2 g/cm$^3$
Open time: approximately 60 minutes
Peel strength after 24 hours: 1.0 N/mm.

EXAMPLE 2

A floor covering adhesive is formulated from the pre-manufactured materials from Example 1 as follows:

| | |
|---|---|
| Latex/resin mixture from Example 1, step 2 | 23.1 weight % |
| Acrylate dispersion | 16.1 weight % |
| SBR latex as in Example 1 | 4.2 weight % |
| Triethylene glycol ester | 8.2 weight % |
| Calcium carbonate filler | 39.0 weight % |
| KOH solution (45%) | 0.4 weight % |
| Thickening agent | 1.0 weight % |
| Water | 7.9 weight % |
| Preservative | 0.1 weight % |

This adhesive is suitable for universal applications such as for bonding textiles and elastic floor coverings. It is stable in a temperature range of 5 to 60° C. over a period of more than 12 months and has the following technical data:
Viscosity: approximately 50,000 mPas
Specific weight: 1.3 g/cm$^3$
Open time: approximately 30 minutes
Peel strength after 24 hours: 1.2 N/mm.

Now that the preferred embodiments have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A method for the manufacture of aqueous floor covering adhesives without the addition of solvents or plasticizers and with a dispersion of a non-carboxylated styrene/butadiene (SBR), as well as of an agent providing initial adhesion comprising the steps of providing the agent above the agent's melting point, thereby providing a melt of the agent providing initial adhesion, adding the melt of the agent providing initial adhesion to the SBR dispersion under high shear forces for the purpose of obtaining a durably stable emulsion.

2. The method according to claim 1, wherein the dispersion is alkaline at the time the agent providing initial adhesion is added.

3. The method of claim 1 wherein content of said dispersion in the emulsion based on the weight of the solids is 10 to 99 weight %.

4. The method according to claim 1 wherein the agent providing initial adhesion has a melting point of 45 to 130° C.

5. The method according to claim 4 wherein the agent providing initial adhesion is selected from the group consisting of a tall oil resin, a rosin, at least one of the said resins, a glycerine ester, a trialkylene glycol ester, wherein each alkylene group about 1 to 4 carbon atoms, and mixtures thereof.

6. The method according to claim 5 wherein the resin or resin ester providing adhesion has an acid value of 0 to 40.

7. The method according to claim 1 wherein the proportion by weight of the polymer dispersion and the agent providing adhesion in the emulsion is about 100/1 to 1/4, in relation to the polymer content of the dispersion.

8. The method according to claim 1 wherein the pH value in the emulsion is adjusted to at least about 8.

9. The method according to claim 8 wherein the pH value in the emulsion is adjusted to about 8.5 to 10.

10. The method according to claim 1 wherein an additional polymer is added to the emulsion.

11. The method according to claim 1 wherein the additional polymer is selected from the group consisting of polyacrylate, polyacrylate ester, acrylonitrile copolymer, vinyl ester/vinyl acetate/ethylene polymer, ethylene vinyl acetate, vinyl acetate/versatate copolymer, styrene/butadiene copolymer, and mixtures thereof.

12. The method according to claim 1 wherein conventional additives for floor covering adhesives are added to the emulsion.

* * * * *

UNITED STATES PATENT AND TRADEMARK OFFICE
CERTIFICATE OF CORRECTION

| | | |
|---|---|---|
| PATENT NO. | : 7,169,840 B2 | Page 1 of 1 |
| APPLICATION NO. | : 10/267001 | |
| DATED | : January 30, 2007 | |
| INVENTOR(S) | : Jochem Billecke et al. | |

It is certified that error appears in the above-identified patent and that said Letters Patent is hereby corrected as shown below:

Column 4, line 28, "600 C" should read --60° C--

Signed and Sealed this

Twenty-sixth Day of June, 2007

JON W. DUDAS
*Director of the United States Patent and Trademark Office*